United States Patent [19]

Adler

[11] Patent Number: 4,760,866
[45] Date of Patent: Aug. 2, 1988

[54] COMBINATION STOP AND PRESSURE REDUCING VALVE AND STOP COCK VERSION

[75] Inventor: Hans Adler, New York, N.Y.

[73] Assignee: H. Adler Associates, Inc., New York, N.Y.

[21] Appl. No.: 331,671

[22] Filed: Dec. 17, 1981

Related U.S. Application Data

[60] Continuation-in-part of Ser. No. 96,335, Nov. 21, 1979, abandoned, and a continuation-in-part of Ser. No. 96,336, Nov. 21, 1979, abandoned, and a continuation-in-part of Ser. No. 96,337, Nov. 21, 1979, Pat. No. 4,305,423, each is a division of Ser. No. 920,014, Jun. 28, 1978, Pat. No. 4,284,102.

[51] Int. Cl.$^4$ .......................................... F16K 31/122
[52] U.S. Cl. ............................ 137/614.17; 137/505.18
[58] Field of Search .................. 137/614.17, 505.18, 137/495

[56] References Cited

U.S. PATENT DOCUMENTS

| | | | |
|---|---|---|---|
| 2,854,025 | 9/1958 | Terry | 137/505.38 X |
| 3,358,964 | 12/1907 | Cohen | 137/505.18 X |
| 3,550,623 | 12/1970 | Katchka | 137/505.18 X |
| 3,701,598 | 10/1972 | Katchka | 137/614.17 X |
| 3,854,497 | 12/1974 | Rosenberg | 137/614.17 |
| 4,314,582 | 2/1982 | Drori | 137/505.18 X |

Primary Examiner—Alan Cohan
Attorney, Agent, or Firm—Stoll, Wilkie, Previto & Hoffman

[57] ABSTRACT

For purposes of the stop of flow of water and the reduction of excess pressure in potable or sanitary water supply pipe lines, a Combination Stop and Pressure Reducing valve having one bonnet only. This combination valve, of the same size as the conventional stop valve now used in the plumbing industry, replaces the stop valve at its commonly used location and, simultaneously replaces the pressure reducing valve which is generally installed elsewhere in the pipe lines. A stop cock version is provided in which the pressure reducing assembly is contained within the valve bonnet which is, in turn, secured to the valve body for opening and closing by rotatable or longitudinal displacement of the bonnet.

2 Claims, 3 Drawing Sheets

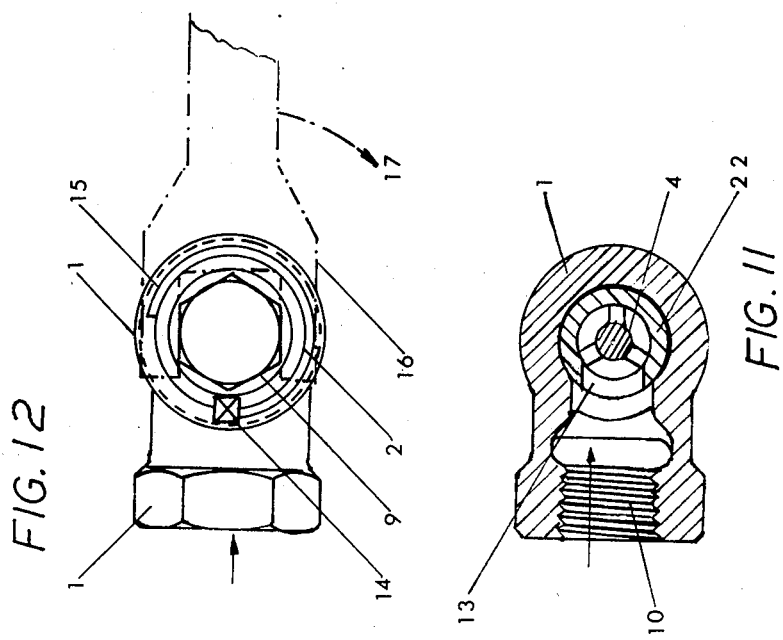
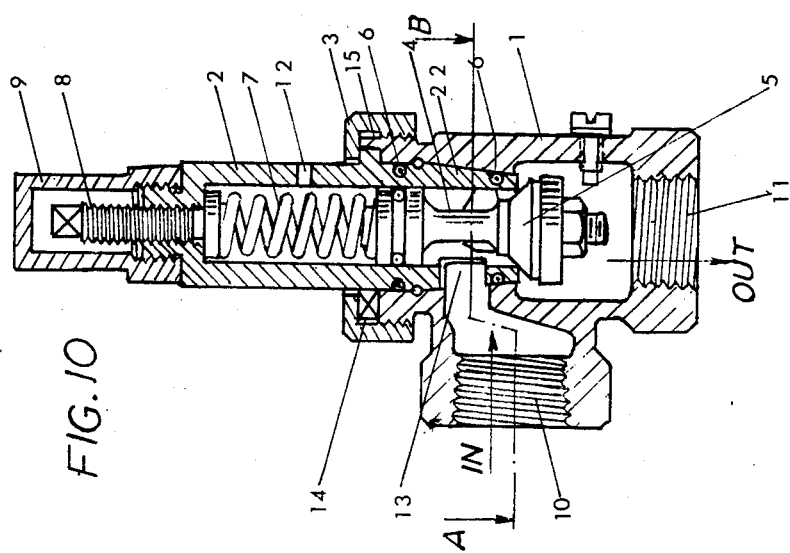

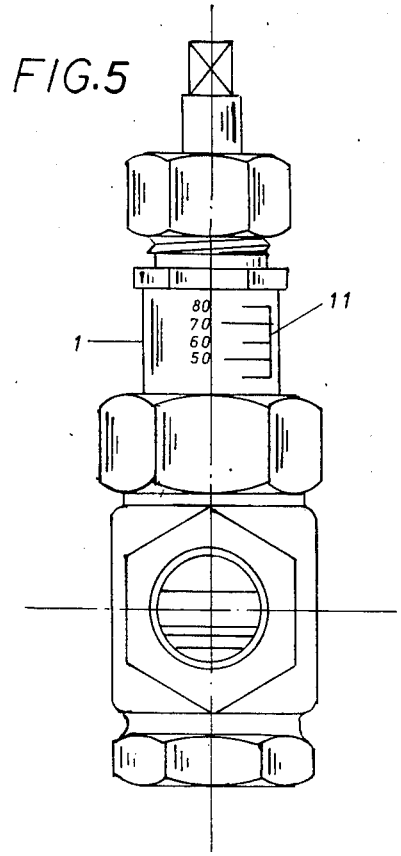
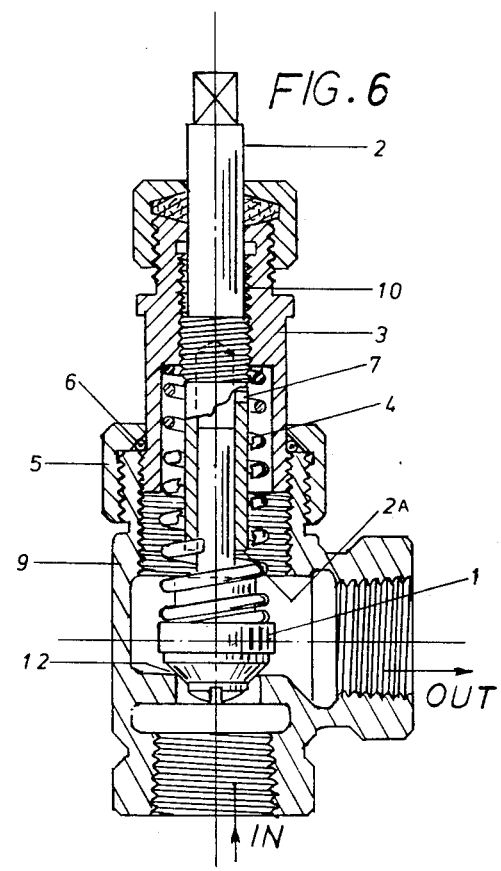
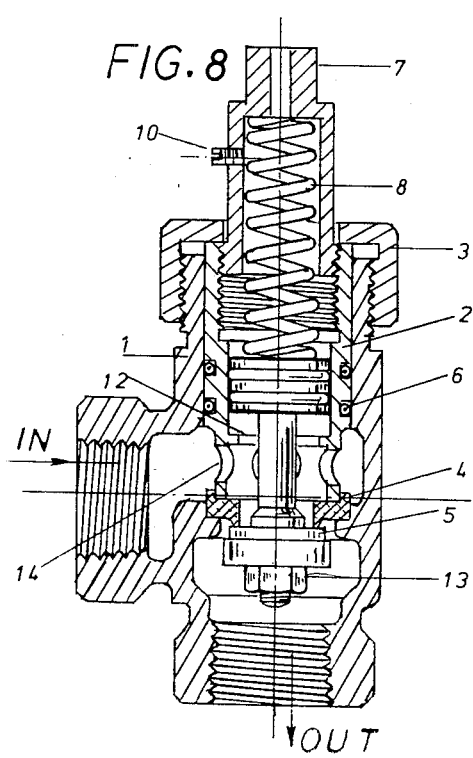
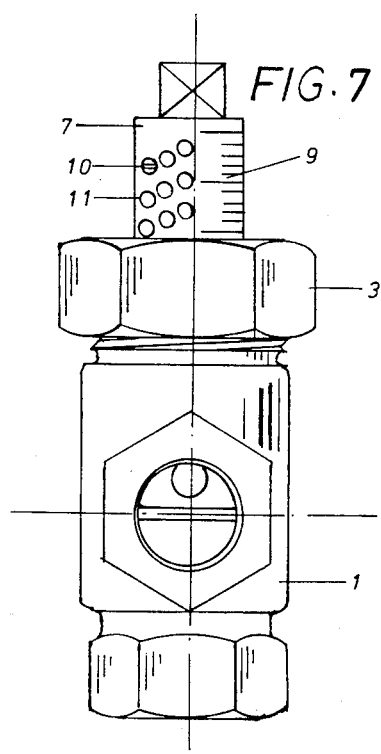

COMBINATION STOP AND PRESSURE REDUCING VALVE AND STOP COCK VERSION

REFERENCE TO RELATED DOCUMENTS

This application is a continuation-in-part of each of U.S. patent applications Ser. Nos. 96,335, 96,336 both abandoned and 96,337, all filed Nov. 21, 1979, said applications each being a divisional of U.S. patent application Ser. No. 920,014, filed June 28, 1978, now U.S. Pat. No. 4,284,102, issued Aug. 18, 1981. Reference is further made to U.S. Pat. No. 4,305,423, issued Dec. 15, 1981, based upon U.S. patent application Ser. No. 96,337, previously referred to. Reference is also made to Disclosure Document No. 56,889, filed Jan. 11, 1977.

BACKGROUND OF THE INVENTION

Various kinds of water pressure reducing valves are available for use by the plumbing industry. Such valves are used in high rise buildings in order to reduce excessively high pressures found in the water supply system at the lower floors. Installation of such valves, with its specially designed pipings, fittings, added labor, instrumentation and extra required space is rather costly. For the lower floors with pressure reducing valves, a plumbing layout must be provided differing from the layout of the upper floors which have no pressure reducing valves.

Furthermore, installation of pressure reducing valves, when needed, is in addition to the routine installation of the mandated stop valve, commonly called "Stop". This Stop is usually installed at an easily accessible location, near faucets, other plumbing fixtures or equipment to facilitate servicing without shutting off other installations.

High water pressure is provided by pumps at the base of high rise buildings so that water can reach the roof tanks or upper floors. Thus, when lower floors of a high rise building are served by the same water supply system as the upper floors, the lower floors are exposed to excessively high water pressures. Maximum acceptable water pressures at plumbing fixtures are specified in building and plumbing codes in order to prevent accidents, to extend the useful life of installations and to conserve water and energy. Pressure reducing valves are available for all ranges of pressure, both incoming and outgoing, and it is essential that they hold the reduced pressure also at no flow condition.

For convenience in the text, the abbreviation PRV stands for Pressure Reducing or Regulating Valve.

The operational properties of the various available types of PRVs meet the requirements of a wide range of application and installation methods. PRVs with the necessary accessories, are installed either in branch lines near points of water consumption (faucets or outlets) or at distant stations to serve a whole zone. Each zone, consisting of one or several floors, is served by a separate water supply system and such stations are at time equipped with extensive instrumentation, including alarm systems.

For purposes of maintenance of PRVs, another valve the "Shut-Off" valve (sometimes more than one) is installed in the pipe lines. Thus, not only is accessible space required for the PRV but additional approachable space is also needed for the shut-off valve with all its connecting pipings and fittings.

When PRVs are installed in stations, space must be provided there for bypasses, shut-offs, instrumentation and alarm systems. When installed in branch lines, near points of water consumption, space has to be provided in walls, ceilings or cabinets behind access doors.

Installation of any type PRV, therefore, must take into consideration some or all of the following necessities: Special layout for the plumbing system; additional space requirements; additional labor for installation; additional pipings, fittings, instrumentation; provisions for easy access.

Also relevant is that the application of the presently available PRVs requires consideration of their mechanical and hydraulic features. In PRV stations, the number of floors must be limited because of the high hydraulic energy loss in all PRVs. Should there be a failure, a whole zone is thus effected. If installed in branch lines, these problems cannot arise.

As for individual PRVs installed near points of water consumption or in branch lines, such PRVs are usually located behind access doors in walls or in ceilings; most often, they are difficult to reach for adjustment or servicing.

With limited success, improvements have been made for installation near the point of water consumption in water supply lines by combination of PRV and Shut-Off Valves in conventional small sizes. Such combinations, however, have two bonnets and one valve body; one bonnet to reduce water pressure and the other to shut off the water. Because the bonnets are placed on opposite sides of the valve body, or placed side by side in a double body, the dimensions are by necessity still large and costly to install. Extended accessible space is still required for installation and servicing, as well as a special plumbing layout and special labor.

For fire stand pipes and hose lines, globe and angle body single bonnet combination pressure reducing valves exist. Due, however, to their special design features, an adaptation, such as a mere reduction in size, would not make them suitable for installation and service in potable water pipelines.

SUMMARY OF THE INVENTION

This invention relates to a combination pressure reducing and stop valve for potable water supply lines in high pressure zones.

The object is to have a combination PRV and Stop valve unit with dimensions, shape and connections enabling it to fit into the space provided in potable water pipelines for the conventional stop valve or Stop.

Another object of the invention is to provide a combination valve with one body and one bonnet thus making it as easily accessible as the bonnet of a Stop valve.

A further object of the invention is that this combination valve should not require a special plumbing layout for high pressure zones, no additional labor, and no additional material whenever installation is required in potable water supply lines with excessively high water pressures.

Still another object is to compose the valve from parts which are designed for durability as well as easy exchangeability in order to provide a life-time comparable to that of a Stop valve.

More specifically, this invention comprises a globe valve or an angle valve with a bonnet and a central threaded valve stem or similar device. This device can be turned in or out by a hand wheel or other means in order to close or open the valve for the flow of water, as is required of a Shut-Off or Stop valve. In particular, the valve of the present invention may have a bonnet that can be rotated or displaced axially in the valve body like a cock or a plug in a plug valve in order to open or close the valve.

Furthermore, the bonnet contains pressure reducing means as described in the following:

Concentrically located is a helical compression spring which exerts an adjustable spring force on the valve piston carrying the valve disc either in the opening or closing direction. This serves to regulate or reduce the water pressure on the outlet side of the valve—as will be explained in detail in the description of preferred embodiments.

The reduced pressure can be preset by the supplier or adjusted in the field at any time.

The shut off section of such a combination valve is used exactly like a stop valve whenever repairs have to be made, i.e. repairs on faucets, automatic dishwashers and other equipment. If, however, the shut off device is open, the valve automatically becomes a PRV. Its spring and other related pressure regulating devices go into action to obtain the specified or desired reduced outlet pressure.

This invention easily allows individual adjustment and equalization of water pressures in the field because the valve itself, and the means of adjustment in it, are readily accessible manually or with conventional tools. This is especially valuable for the hot and cold water supply in bathrooms, washrooms, showers, kitchens, etc.

In the following text, the abbreviation PRV-STOP is used for the combination Stop and Pressure Reducing Valve.

GENERAL DESCRIPTION OF THE STOP COCK VERSION

In the present invention, pressure reducing elements have been included in shut-off Plug Valves or Ball Valves. The bodies of such valves may be angle bodies or straight bodies. The pressure reducing elements are foremost located inside the so-called bonnet of the valve and the part of the bonnet located in the valve body is shaped suitably to form either the plug or the ball for the shut-off of the valve by partial rotation of the bonnet or a combination of displacements.

The pressure reducing means contained foremost in the bonnet are a piston with a valve disc movable either in the opening or closing direction against a valve seat. The valve seat is located between the inlet and outlet of the valve.

Further means contained in the bonnet are a helical compression spring which exerts an adjustable spring force against said piston and an adjusting screw for increasing or decreasing the spring pressure against the piston.

The piston may be of the spring operated direct acting single piston type or of the balanced double piston type which is generally used with spring adjustment to cover most ranges of desirable reduced pressures.

The balanced double piston type may also be used without a spring for adjustment in case low reduced pressures are acceptable or desired, or if other means to obtain a closing or opening bias are provided such as differences in the diameters of the piston and valve seat.

BRIEF DESCRIPTION OF THE DRAWING

Furthermore, FIG. 1 shows a handwheel for opening and closing the stop section, and the pressure reducing section is of the spring actuated single piston type.

FIG. 5 shows a view and FIG. 6 shows a cross section along the main axis of an angle valve of the type where the bonnet serves the additional purpose of adjusting the spring force for pressure regulation of the spring actuated single piston.

FIG. 7 shows a view and FIG. 8 shows a cross section along the main axis of an angle valve of the type where a hollow stem enclosing the spring can be screwed in or out of the bonnet in order to shut off the valve or to adjust the pressure reduction by adjusting the spring force on the piston. In this version, the pressure reducing section is again of the balanced double piston type.

FIG. 10 is a sectional view of a Cock-Version PRV-Stop taken along the center line extending through the bonnet, protective cap, adjusting screw, helical spring, piston, valve disc and seat and thus extending also through the union nut and valve body. This version has the body of an angle valve.

Furthermore, FIG. 10 shows a bonnet extending into the body with a conical plug and aperture for opening and closing the valve by a partial axial turn of the bonnet, and the pressure reducing section inside the bonnet is of the balanced double piston type.

FIG. 11 is a cross section through the angle valve in the planes indicated by line A-B of FIG. 10 extending through the valve body, the plug section of the bonnet with aperture and the piston to show that the valve can be closed by partially rotating the bonnet.

FIG. 12 is a top view of the valve after removal of the union nut in order to show the usage of a wrench to rotate the bonnet and the means to stop rotation in fully open or fully closed position of the valve.

DESCRIPTION OF THE PREFERRED EMBODIMENTS

In the present invention, pressure reducing elements have been included in water shut off globe or angle valves. The pressure reducing elements are foremost located in the so-called bonnet of the valve.

The longitudinal movement of the stem activated by its rotation serves the purpose of opening up and closing off the water flow through the valve by acting on the disc of the valve, pressing it against the valve seat or moving it away from the valve seat. Inherent in the stem movement are its stops in the closed position and in the far open position. In the closed position, the flow of water is stopped completely. If the stem however moves into the fully open position, the valve works as a pressure reducing valve at preadjusted pressures by the means described below in the preferred embodiments.

Figure 1:
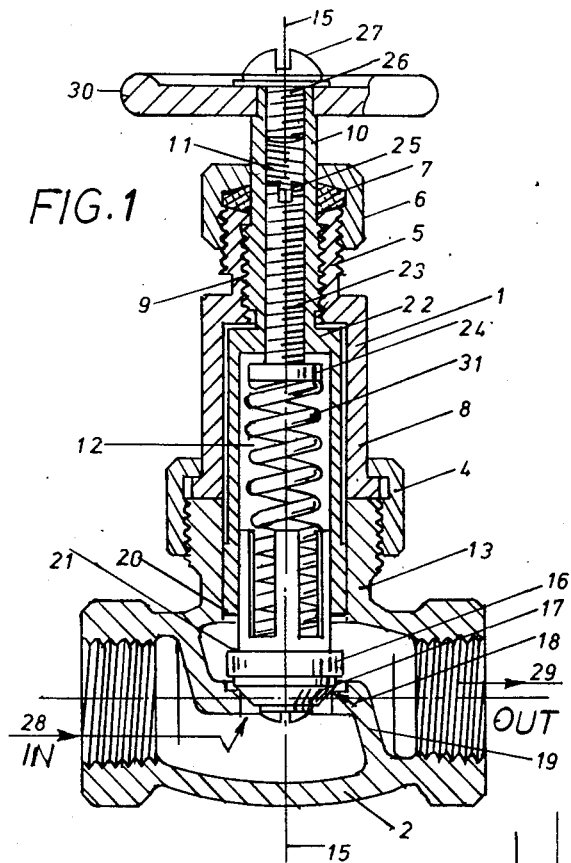
FIG. 1 is a sectional view of one version PRV-STOP taken along the centerline extending through the bonnet, valve stem, handwheel, adjusting screw, helical spring, piston, valve disc and seat of a PRV-STOP and thus extending also through the valve body. This version has the body of a globe valve.
Figure 2:
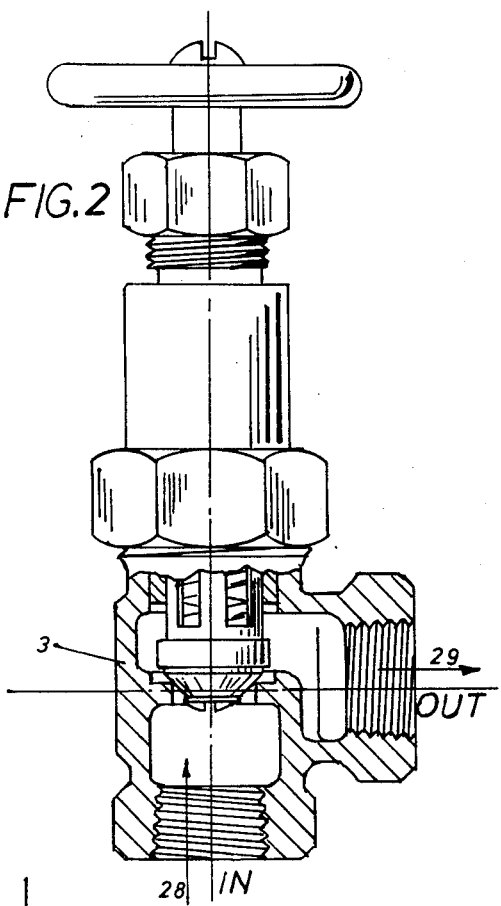
FIG. 2 is a sectional view along the centerline of another version. This version differs from the one shown in FIG. 1 because in FIG. 2, the body of an angle valve is shown. However, the elements serving the purpose of shut-off and pressure reduction are identical in FIG. 1 and FIG. 2.

One preferred form of pressure reducing assemblies described here is shown in FIG. 1 and 2 of the attached drawings. The pressure reducing assembly is contained in the bonnet of the valves. In FIG. 1, the bonnet with the designation 1 is connected with a globe body designated 2. In FIG. 2, an identical bonnet is connected with an angle-body designated 3. In all other respects, the same description is valid in FIG. 1 and FIG. 2.

The wide end designated 8 of the bonnet is connected with the body by a union nut 4. The narrow end of the bonnet carries a female thread 9 to receive the matching thread of the stem 10. The bonnet is closed water tight against the smooth moving end of the stem by any kind of packing. The kind shown consists of packing nut 6, packing 7, and the matching part of the bonnet. The bonnet encloses and guides the stem 10 in its rotating and longitudinal movements along and around its axis 15.

The stem is tubular and has at one end a section with a narrow inside diameter and female thread 11. The other cylindrical section 12 has a wide diameter and is smooth inside and outside. The outside form of the stem shows various diameters providing the necessary wall thickness and in turn the bonnet is constructed to accommodate the stem. The wide end of the stem reaches into the body 2 or 3, and is guided inside the neck 13 of the body for the longitudinal and rotating movement of the stem concentric with axis 15. Inserted into the wide end 12 of the stem is the hollow cylindrical section of the piston 16 allowing the piston to move easily in the longitudinal rotating direction. The drawing shows a version where the cylindrical end of the piston is slotted open to provide wash away space preventing accumulation of clogging matter.

On the other end, the piston carries an exchangeable disc or cone washer 17, made from a suitable semisoft material. This disc closes the valve if the piston presses it tightly against the valve seat, disc seat or seat ring 18 in the valve body partition wall 19.

If the stem is turned the other way, it retracts into the bonnet until the shoulder 22 of the stem hits the end wall of the wide part of the bonnet. In this case, the valve is in the open position and the assembly works as a pressure reducing valve as follows:

The helical compression spring 31 presses against the piston 16 in the closing direction. The spring pressure is adjustable by means of the adjusting screw 23 which can be screwed both ways inside the narrow part of the stem. One end of the adjusting screw carries a spring top 24. The other end has a socket or slot 25, in order to turn the adjusting screw with a socket wrench or screw driver by inserting it into the hollow stem through the front opening 26.

The front opening 26 is closed against the inside water pressure by an end screw 27 and a washer. This screw is also holding handwheel 30 on the stem in this version. This endscrew, however, can be of different design in versions where the stem is turned by other mechanical means instead of the handwheel shown here.

Having described the pressure reducing parts of this version, the pressure reduction assembly will reduce the excessively high water pressure in the inlet 28 of the valve body to an acceptable low water pressure in the outlet 29 of the valve body as follows:

The high pressure on the inlet 28 exerts a lifting force against the piston 16 which in turn is counteracted by the force of the spring 31. As long as the inlet pressure is high enough to lift the piston, water is flowing through the valve seat 18 building up the water pressure on the outlet side 29.

The outlet pressure exerts a counter pressure on the piston in the same direction as the spring, and as soon as the outlet pressure has reached the specified maximum pressure, spring pressure together with the outlet pressure balance the inlet pressure, and the flow of water stops. It is clear for higher inlet pressure, the spring tension must be adjusted higher in order to reduce to the same outlet pressure.

It is also usual to use heavier springs for higher ranges of inlet pressures and vice versa. Nevertheless, it is the preset reduced pressure that, when reached, shuts the flow off through the valve by direct action of the piston.

It can be seen also from the foregoing description that the pressure reducing section is identical with a most frequently used conventional PRV type which is the spring operated direct acting single piston type. This type is simple and practical especially in high rise buildings where the water supply pressure on the inlet side of the valve does not vary at all or very little because gravity feed from tanks or constant pressure supply pump systems are used.

Figure 4:
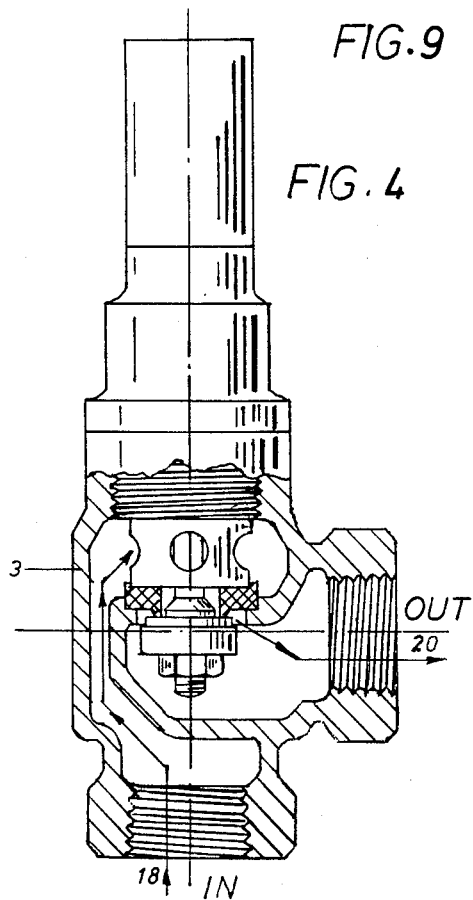
FIG. 4 shows a fourth version along the same principles as the third version but with an angle body.
Figure 3:
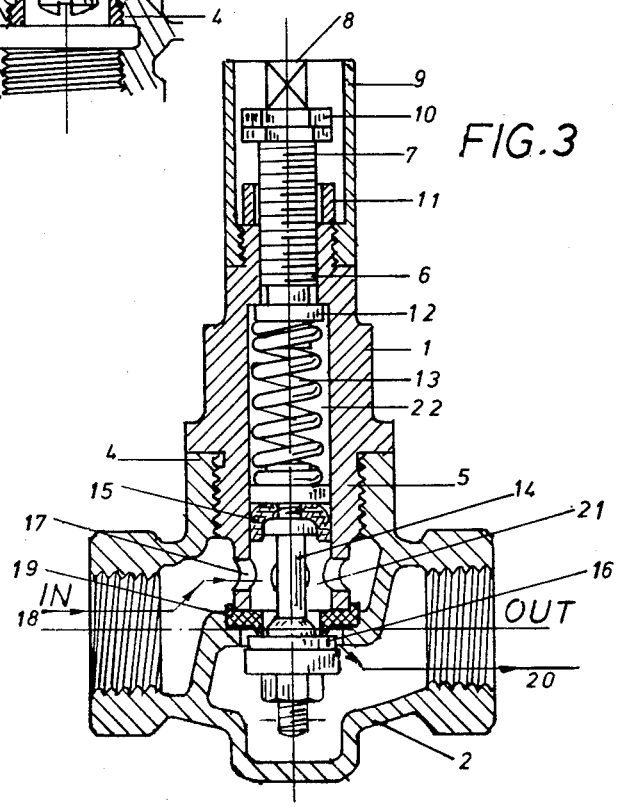
FIG. 3 is a sectional view along the centerline of a third version with a globe body, however, with elements serving the purpose of shut off and pressure reduction differing from the elements shown in FIG. 1 or 2. The stem is protected by a lockshield and has a square end to be turned by a lockshield key. The pressure reducing section is of the balanced double piston type.

Another preferred version pressure reducing or regulating assemblies is shown in FIG. 3 & 4 of the attached drawings. This kind of assembly satisfies the requirement that the reduced pressure, delivered by the reducing valve, shall not deviate more than 10% of the change in the initial pressure. Although this requirement is not important in most applications, because the initial pressure is steady, the pressure reducing assembly shown in FIG. 3 and 4 is suitable for all applications. It has the advantage of mechanical and hydraulic simplicity and efficiency. The pressure reducing assembly as well as the shut off assembly are fully contained in the bonnet.

In FIG. 3, the bonnet with the designation 1 is connected with a globe body designated 2. In FIG. 4, an identical bonnet 1 is connected with an angle body designated 3. In all other respects, the same description is valid for FIG. 3 and 4. Bonnet 1 is screwed pressure tight into neck 4 of the body 2 and 3 by means of the male thread 5 of the bonnet and the female thread in the neck of the body. The narrow end of the bonnet has a female thread 6 to receive the matching thread of the stem 7.

The stem serves two purposes. First, it serves to close and open the valve for the flow of water; and second, it serves as the adjusting screw to regulate the reduced pressure. In this version the stem 7 is turned for in and out movement by means of the square head 8. Furthermore, a lock shield 9 is screwed onto the bonnet requiring a conventional lock shield key for turning the stem. All other conventional methods, however, for rotating the stem are also applicable.

On the protruding end, the stem carries a combination of stop nuts 10 and set ring 11 which serve as adjustable stops to limit the movement of the stem in the inward direction. The other end of the stem is shaped as the spring top disc 12 for the helical compression spring 13 inside the bonnet. As the spring top 12 is firmly connected with the stem 7, the stem can only be screwed in the outward direction until the back of the spring top hits the end at the spring chamber section 22 of the bonnet.

The spring 13 exerts a force against the piston assembly 14. The assembly 14 works inside the piston chamber section 21 of the bonnet as a double piston; whereby the inlet water pressure exerts a force on the piston end with the cup washer 15 in the direction against the spring 13. In the opposite direction, the inlet water pressure also exerts a force on the other piston end which carries the valve disc 16, to move it away from the bonnet and seat ring 19.

The inlet water pressure communicates with the piston chamber section of the bonnet through the apertures 17, and permits the flow of water from the valve inlet 18 through the opening of the seat ring 19 to the outlet 20 of the valve.

The inside diameter of the piston chamber 21 or outside diameter of the cup washer end 15 of the piston sliding in the piston chamber is sufficiently larger than the inside diameter of the opening of the seat ring 19 to cause a force bias. This force bias by the inlet pressure forces the piston towards the spring chamber section 22 and thus presses the valve disc 16 against the seat ring 19, shutting off the valve against any water flow. This takes place if stem 7 is, to its full extent, retracted into the top of bonnet 1. Thus the spring 13 no longer exerts a force against the piston assembly 14 which can then move freely. Under this condition, the flow of water stops automatically at any pressure. This means that the valve acts as a stop by screwing the stem out of the bonnet as far as mechanically possible. This is due to the bias force on the cup washer end 15 which is strong enough to press the seat disc 16 tight against the seat ring 19. As previously mentioned, seat ring 19 has a smaller inside diameter than the outside diameter of the cup washer 15.

In order to open the valve for flow, stem 7 has to be screwed into the bonnet. The spring top end of the stem 7 will compress the spring 13 to exert a force against the piston 14 sufficient to move the disc seat 16 away from the seat right 19, thus opening the valve for flow. This flow will be maintained until a pressure built up on the outlet side develops, exerting a force against the seat end of disc seat 16 of the piston 14, sufficient to overcome the opposing force of spring 13. This closes the disc seat 16 tightly, thus again shutting off the flow through the valve.

As the disc seat is then closed tightly, the pressure on the outlet side of the valve cannot go up further. This outlet pressure is the reduced pressure at which the valve is set. This reduced outlet pressure, or dead end setting, can be adjusted higher or lower by changing the spring pressure by means of screwing the stem 7 more or less into the bonnet, serving simultaneously as an adjusting screw.

The dead end setting can be achieved with the help of the stopnut 10 and set ring 11. In accordance with the above description, the flow through the valve can be stopped by screwing the stem 7 out of the valve as far as it goes and the valve will function as a pressure reducing valve at the preset outlet pressure if the stem is screwed into the valve as far as it goes.

Still another preferred version of pressure reducing and stop valves, in form of an angle valve of the single piston type, is shown in FIG. 5 and 6 of the attached drawings; differing however from the version shown in FIG. 1 or FIG. 2 by some important features as described below:

Piston 1, with its slim rod end, slides into the hollow end of stem 2, whereas the spring 4, pressing the piston head against the valve seat, is located outside the stem. The valve can be closed or opened completely by screwing stem 2 in or out by means of thread 10 in the bonnet 3. The valve is closed when the inner end 2A of the stem presses piston 1 against the valve seat 12. Piston 1 can move freely when the stem 2 is turned out of the bonnet as far as it can go, thus the valve becomes a pressure reducing valve. The spring force can be adjusted by screwing the bonnet 3 in or out of the body 9. Union nut 5 holds the bonnet 3 in the neck of the valve body 9, and pressure tightness is achieved by O-ring 6 or means to the same effect.

The bonnet 3 can be screwed in or out of the body as far as it goes and the bonnet thus protrudes more, or less, from the body or union nut. The bonnet 3 can thus carry a visible scale 11, indicating the pressure reduction of the valve. The female thread 10, in the bonnet, is long enough to permit the stem 2 to move in or out in any position of the bonnet. This means that the female thread 10, in the bonnet, is as long as that of the male thread of the stem, plus the length of piston movement. The functional features of this stop and pressure reducing valve shown in FIG. 5 and FIG. 6 as an angle valve can just as well be applied to a globe valve.

In FIG. 7 and FIG. 8 of the attached drawings, another preferred version of pressure reducing and stop valve in shown, of the type with balanced double piston. Again, this version is presented as an angle valve, but can just as well be designed as a globe valve. FIG. 7 is a view of the inlet side of this version. FIG. 8 is a cross section along the vertical axis and through the inlet end of the angle valve.

A tubular bonnet 2 is inserted, fitting closely, into the mouth or neck of body 1 and pressed into the body by union nut 3. One or more O-rings in outside grooves of the bonnet 2 assure pressure tightness between body 1 and bonnet 2. The lower end of the bonnet 2 presses valve seat 4 tightly into the partition opening of the valve body. Apertures 14 are located in the lower end of the bonnet 2 in order to allow the valve fluid to flow from the inlet to the valve seat, and out of the valve if the value disc is in open position. Disc 5 is firmly attached to the double piston 6 by means of washer and nut 13. Piston 6 can slide up and down, pressure tight, in the smooth middle section of bonnet 2. The pressure tightness of the piston between the inside of the valve and the outside atmosphere is assured by such seals as O-rings shown here, or by cup washers as shown previously in FIG. 3 or FIG. 4—or by other sliding seals.

The outside diameter of the sliding piston is larger than the inside diameter of the valve seat 4 at the opposite end of the double piston. This is so in order to produce a bias force in the closing direction of the valve, and to keep the valve closed automatically in consequence of the valve inlet pressure. In order to open the valve, an adjustable spring 8 is provided, pressing against piston 6 to overcome the above bias force, and to push the seat in the outlet direction. Spring 8 will keep piston 6 with valve seat 5 open until pressure on the outlet side of the valve builds up to compensate and stop the flow through the valve once again.

Spring 8 is encased in the hollow valve stem 7 which can be screwed in and out of the top end of the bonnet 2, thus increasing or decreasing the spring force. If stem 7 is screwed all the way out, as far as it goes, until its threaded section touches union nut 3, the spring force is zero. Thus the outlet pressure is reduced to zero and the valve is closed. If the stem 7, is screwed into the bonnet, the spring force against the piston 6 grows, and so does the reduced outlet pressure up to a maximum.

The range of the adjustable reduced outlet pressures depends on the following factors: Inlet pressure, the relation of piston diameter to valve seat diameter, and the size of the spring. Within this range, the outlet pressure can be adjusted to a preferred level by changing the spring compression as described above. It can be preset permanently by means of a set screw 10, screwed into one of the screw holes 11 in stem 7. Such screwholes can be provided in various heights of stem 7.

The set screw 10, inserted into one of the screwholes 11 prevents the stem 7 from being screwed into the bonnet beyond the point where the set screw touches the union nut 3. In accordance with these features, the valve can be closed by screwing the stem out of the valve as far as it goes, and can be opened to the preset reduced pressure by screwing the stem into the valve, as far as it goes. Piston displacement in the direction of opening the valve is limited by a ridge 12 in this form of an angle valve.

Figure 9:
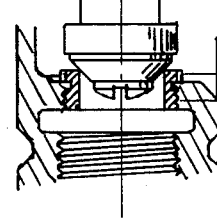
FIG. 9 is a cross section through that part of an angle valve where the valve seat is located in order to show an exchangeable seat ring.

FIG. 9 shows a modification of the preferred embodiments, as shown in FIG. 1, FIG. 2, FIG. 5 and FIG. 6. In FIG. 9, part 3 is an exchangeable seat ring made out of a wear resistant material. This seat ring 3 is screwed, or in other ways affixed, into the valve opening 4 of the valve body.

The seat ring 3 serves the purpose of extending the life of the PRV-STOP beyond the life expectancy of the plumbing system wherever this invention is applied.

In the preferred embodiments, FIG. 3 and 4 or FIG. 7 and 8, exchangeable seat rings are already shown.

One preferred form of pressure reducing assembly and stop valve described here is shown in FIGS. 10, 11 and 12 of the drawing. The pressure reducing assembly is contained in the bonnet 2 of the valve. The bonnet 2 reaches with its conical plug end 22 into the angle body 1 to fit into the conical bore of the body. The bonnet 2 is rotably connected with the body 1 by union nut 3 which is tightened against the ridge 15 of the body 1.

The thickness of the flange of the bonnet 2 inside the union nut 3 is slightly less than the height of ridge 15 in order to permit rotation of the bonnet without freezing inside the body. The bonnet 2 has an aperture 13 connecting with the inlet 10 of the valve body 1 if the bonnet is in the open position. If the bonnet is turned clockwise by 90° the valve is closed because the aperture 13 then faces the wall of the body 1.

The plug end 22 of the bonnet 2 is equipped with 2 O-rings 6 one each axially removed above and below the aperture 13 in order to hold the plug valve tight against high pressures without jamming. The double piston 4 slides with its cylindrical end in the smooth bore of the bonnet 2. The cylindrical end of the piston is pressure tight secured in the bore of the bonnet with one or more O-rings (or other means such as a cup washer).

The piston 4 on its opposite end has a conical seat ring 5 made of rubber or other plastic material of a suitable hardness which closes the valve seat against flow if the desired outlet pressure is reached at outlet 11.

The space of the bonnet bore between the piston and the closed end of the bonnet 2 serves as spring chamber for spring 7. The spring chamber is connected with the atmosphere through vent hole 12 in the bonnet wall in order to prevent pressure build up inside the bonnet which would prevent correct functioning of the piston. The spring pressure is adjustable by means of the adjusting screw 8. The adjusting screw 8 is enclosed by removable acorn (cap) 9 to prevent tampering with the spring pressure.

The seat ring 5 end of the piston 4 is centered in relation to the bonnet bore by 3 radial arms extending from the piston stem and sliding inside the bonnet bore. This is shown clearly in FIG. 11.

FIG. 12 shows that ridge 15 does not extend over the full circle but leaves space free to allow a one quarter circular movement of stone 14 for opening and closing the valve.

The wrench 16 is used for rotating the bonnet in the direction 17 and back. For this purpose flats are machined into both opposite sides of the cylindrical bonnet.

Although the present invention has been described in some detail by way of illustration and example for purposes of clarity and understanding, it is understood that certain changes and modifications may be made within the spirit of the invention and the scope of the appended claims.

The preferred version of the pressure reducing or regulating and shut-off assembly as shown in FIGS. 10–12 of the attached drawing represents the kind of assembly that satifies the requirement that the set-reduced pressure, delivered by the reducing valve, shall not deviate more than 10% of any change in the initial inlet pressure. Although this requirement is not important in most applications, because the initial inlet pressure is steady, the pressure reducing assembly shown in FIGS. 10–12 is suitable for both steady and variable inlet appliations. It has the advantage of mechanical and hydraulic simplicity and efficiency. The pressure-reducing assembly is fully contained in the bonnet.

What is claimed is:

1. A combination shut-off and adjustable pressure reducing valve, suitable for use in water supply lines between a high pressure source and a fixture such as a faucet requiring reduced pressure, comprising:
   a. a valve body, said valve body defining a hollow interior space for a valve bonnet, between an inlet and an outlet,
   b. a valve bonnet, said valve bonnet being at least partially hollow and in rotatably sealed engagement with and protruding from said valve body for rotation with respect to said valve body, and comprising a cylindrical bore with an opening in a side wall thereof communicating with said inlet when in open position and being sealed from said inlet when rotated with respect to said valve body to closed position, said cylindrical bore further comprising an upper end and an open bottom opposite said upper end, said bottom defining a piston engaging face inside the valve body and forming the valve seat, said cylindrical bore being open to said outlet and having a diameter at said valve seat substantially equal to the diameter at said upper end thereof, c. piston means, said piston means being located for movement axial of said valve bonnet, limited by contact with said piston engaging face,
d. adjusting means, said adjusting means comprising an adjusting screw in engagement with said valve bonnet at its protruding end for axial movement relative thereto,
e. a spring, said spring being engaged with said adjusting means and said piston means to provide spring bias between said partially hollow valve bonnet and said piston means, whereby said axial adjusting movement serves to adjust the amount of spring bias,
f. whereby said spring biases said piston means to open and the water pressure on the outlet side of the valve biases said piston means into closing engagement with said valve seat,
g. said piston means comprising a balanced double piston comprising an upper cylindrical end secured in pressure-tight sliding engagement with said cylindrical bore of said valve bonnet, engaging said spring and having substantially the same diameter as that of said upper end of said cylindrical bore of said valve bonnet said piston further comprising a lower end having means to seal against said valve seat, and being closeable by an outlet pressure force greater than said spring bias,
h. the portion of said cylindrical bore above said upper cylindrical end of said piston containing said spring and being vented.

2. A combination shut-off and adjustable pressure-reducing valve in accordance with claim 1, wherein displacement of said bonnet within said body by manual axial rotation opens or shuts off the water supply through the valve without changing the reduced static pressure setting for the water supply through the valve outlet.

* * * * *